(12) United States Patent
Li et al.

(10) Patent No.: US 12,418,390 B2
(45) Date of Patent: Sep. 16, 2025

(54) COMMUNICATION SYSTEM, ELECTRONIC DEVICE, AND DETERMINATION METHOD FOR DETERMINING ECHO NOISE CANCELLING ABILITY

(71) Applicant: Realtek Semiconductor Corporation, Hsinchu (TW)

(72) Inventors: Cheng-Hsien Li, Hsinchu (TW); Bo-Rong Huang, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 342 days.

(21) Appl. No.: 18/341,777

(22) Filed: Jun. 27, 2023

(65) Prior Publication Data

US 2024/0080173 A1 Mar. 7, 2024

(30) Foreign Application Priority Data

Sep. 6, 2022 (TW) ................................. 111133732

(51) Int. Cl.
*H04L 5/14* (2006.01)
(52) U.S. Cl.
CPC .................................. *H04L 5/1461* (2013.01)
(58) Field of Classification Search
CPC .............................. H04L 5/1461; H04B 3/23
See application file for complete search history.

(56) References Cited

U.S. PATENT DOCUMENTS

| | | |
|---|---|---|
| 7,068,982 B2 | 6/2006 | Creigh et al. |
| 7,106,235 B1 | 9/2006 | Yen et al. |
| 7,127,062 B2 | 10/2006 | Casier et al. |
| 7,327,298 B2 | 2/2008 | Zabroda |
| 9,419,779 B2 | 8/2016 | Pan et al. |

(Continued)

OTHER PUBLICATIONS

IEEE Standard for Ethernet Section Three—chapter 40. Physical Coding Sublayer (PCS), Physical Medium Attachment (PMA) sublayer and baseband medium, type 1000BASE-T, in IEEE Std 802.3-2018, pp. 175-291.

(Continued)

*Primary Examiner* — Nizam U Ahmed
(74) *Attorney, Agent, or Firm* — CKC & Partners Co., LLC

(57) ABSTRACT

An electronic device includes a processor circuit, a frequency-domain-to-time-domain conversion circuit, a transmitter circuit, a hybrid circuit, a receiver circuit, and a time-domain-to-frequency-domain conversion circuit. The processor circuit generates a frequency-domain transmitting signal. The frequency-domain-to-time-domain conversion circuit converts the frequency-domain transmitting signal into a first time-domain transmitting signal. The transmitter circuit generates a second time-domain transmitting signal. The hybrid circuit includes an echo noise cancelling path and an echo noise path. When the echo noise cancelling path is turned off, the processor circuit receives a first frequency-domain receiving signal. When the echo noise cancelling path is turned on, the processor circuit receives a second frequency-domain receiving signal. The processor circuit determines an echo noise cancelling ability of the hybrid circuit according to the first frequency-domain receiving signal and the second frequency-domain receiving signal.

20 Claims, 5 Drawing Sheets

(56) References Cited

U.S. PATENT DOCUMENTS

| | | | | |
|---|---|---|---|---|
| 2003/0118177 | A1* | 6/2003 | Karakas | H04B 3/23 |
| | | | | 379/406.01 |
| 2006/0182014 | A1* | 8/2006 | Lusky | H04B 3/23 |
| | | | | 370/252 |
| 2013/0102254 | A1* | 4/2013 | Cyzs | H04B 1/10 |
| | | | | 455/63.1 |
| 2022/0014281 | A1 | 1/2022 | Huang et al. | |

OTHER PUBLICATIONS

IEEE Standard for Ethernet Section Eight—chapter 126. Physical Coding Sublayer (PCS), Physical Medium Attachment (PMA) sublayer, and baseband medium, types 2.5GBASE-T and 5GBASE-T, in IEEE Std 802.3-2018, pp. 222-339.

\* cited by examiner

COMMUNICATION SYSTEM, ELECTRONIC DEVICE, AND DETERMINATION METHOD FOR DETERMINING ECHO NOISE CANCELLING ABILITY

RELATED APPLICATIONS

This application claims priority to Taiwanese Application Serial Number 111133732, filed Sep. 6, 2022, which is herein incorporated by reference.

BACKGROUND

Technical Field

The present disclosure relates to communication system technology. More particularly, the present disclosure relates to a communication system, an electronic device, and a method capable of determining an echo noise cancelling ability.

Description of Related Art

With developments of technology and requirements of high-speed transmission, various communication systems have been developed. For example, two electronic devices in a full-duplex communication system can use only one pair of Ethernet lines to perform bidirectional transmission in Gigabit Ethernet. In other words, each of the electronic devices not only can transmit signal but also can receive signal by hybrid circuits in the electronic devices to achieve the high-speed transmission. However, due to imperfect characteristics of the hybrid circuit, the aforementioned full-duplex communication system has the problem of echo noise.

SUMMARY

Some aspects of the present disclosure are to provide a communication system. The communication system includes a first electronic device and a second electronic device. The second electronic device is coupled to the first electronic device. The first electronic device includes a processor circuit, a frequency-domain-to-time-domain converter circuit, a transmitter circuit, a hybrid circuit, a receiver circuit, and a time-domain-to-frequency-domain converter circuit. The processor circuit is configured to generate a frequency-domain transmitting signal. The frequency-domain-to-time-domain converter circuit is configured to convert the frequency-domain transmitting signal into a first time-domain transmitting signal. The transmitter circuit is configured to generate a second time-domain transmitting signal according to the first time-domain transmitting signal. The hybrid circuit includes an echo noise cancelling path and an echo noise path. The time-domain-to-frequency-domain converter circuit is coupled between the receiver circuit and the processor circuit. The processor circuit receives a first frequency-domain receiving signal from the time-domain-to-frequency-domain converter circuit when the echo noise cancelling path is turned off. The processor circuit receives a second frequency-domain receiving signal from the time-domain-to-frequency-domain converter circuit when the echo noise cancelling path is turned on. The processor circuit determines an echo noise cancelling ability of the hybrid circuit according to the first frequency-domain receiving signal and the second frequency-domain receiving signal.

Some aspects of the present disclosure are to provide an electronic device applied to a communication system. The electronic device includes a processor circuit, a frequency-domain-to-time-domain converter circuit, a transmitter circuit, a hybrid circuit, a receiver circuit, and a time-domain-to-frequency-domain converter circuit. The processor circuit is configured to generate a frequency-domain transmitting signal. The frequency-domain-to-time-domain converter circuit is configured to convert the frequency-domain transmitting signal into a first time-domain transmitting signal. The transmitter circuit is configured to generate a second time-domain transmitting signal according to the first time-domain transmitting signal. The hybrid circuit includes an echo noise cancelling path and an echo noise path. The time-domain-to-frequency-domain converter circuit is coupled between the receiver circuit and the processor circuit. The processor circuit receives a first frequency-domain receiving signal from the time-domain-to-frequency-domain converter circuit when the echo noise cancelling path is turned off. The processor circuit receives a second frequency-domain receiving signal from the time-domain-to-frequency-domain converter circuit when the echo noise cancelling path in the hybrid circuit is turned on. The processor circuit determines an echo noise cancelling ability of the hybrid circuit according to the first frequency-domain receiving signal and the second frequency-domain receiving signal.

Some aspects of the present disclosure are to provide a determination method for determining an echo noise cancelling ability. The determination method is applied to an electronic device in a communication system. The determination method of the echo noise cancelling ability includes following operations: when an echo noise cancelling circuit in a hybrid circuit in the electronic device is turned off, generating, by a processor circuit in the electronic device, a frequency-domain transmitting signal, and converting, by a frequency-domain-to-time-domain converter circuit in the electronic device, the frequency-domain transmitting signal into a time-domain transmitting signal such that the processor circuit receives a first frequency-domain receiving signal from a time-domain-to-frequency-domain converter circuit; when the echo noise cancelling circuit is turned on, generating, by the processor circuit, the frequency-domain transmitting signal, and converting, by the frequency-domain-to-time-domain converter circuit, the frequency-domain transmitting signal into the time-domain transmitting signal such that the processor circuit receives a second frequency-domain receiving signal from the time-domain-to-frequency-domain converter circuit; and determining, by the processor circuit, an echo noise cancelling ability of the hybrid circuit according to the first frequency-domain receiving signal and the second frequency-domain receiving signal.

As described above, in the present disclosure, by the cooperative operation of the frequency-domain-to-time-domain converter circuit and the time-domain-to-frequency-domain converter circuit, the processor circuit can determine the echo noise cancelling ability of the hybrid circuit according to two frequency-domain receiving signals (one corresponding to the condition that the echo noise cancelling path is turned off, the other corresponding to the condition that the echo noise cancelling path is turned on) so as to confirm whether the communication system meets a system requirement.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
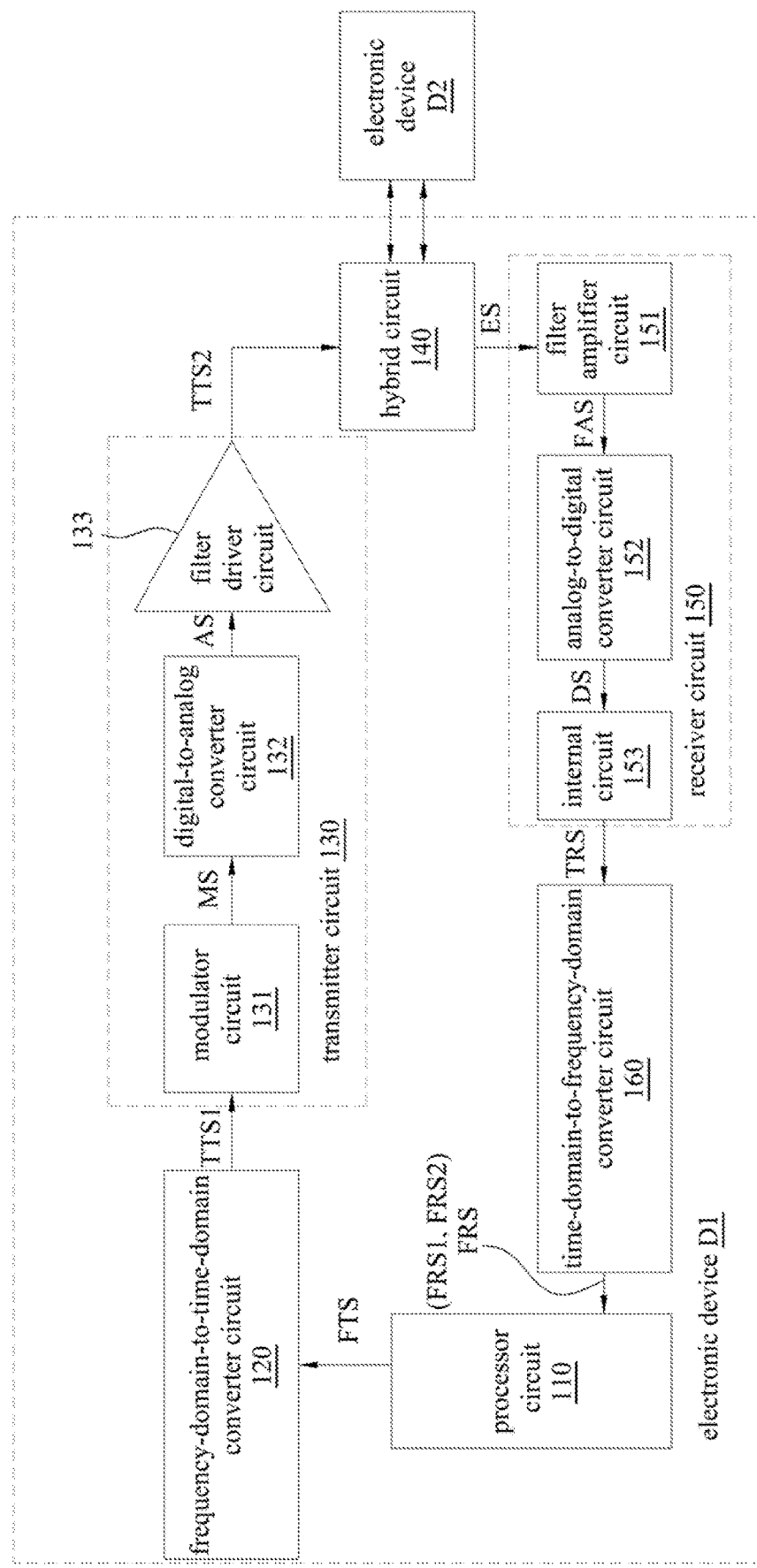
FIG. 1 is a schematic diagram of a communication system according to some embodiments of the present disclosure.

Reference is made to FIG. 1. FIG. 1 is a schematic diagram of a communication system SYS according to some embodiments of the present disclosure.

As illustrated in FIG. 1, the communication system SYS includes an electronic device D1 and an electronic device D2. The communication system SYS can be, for example, a full-duplex communication system, but the present disclosure is not limited thereto. The electronic device D1 and the electronic device D2 can use only one pair of Ethernet lines to perform bidirectional transmission in Gigabit Ethernet. In other words, each of the electronic devices not only can transmit signal but also can receive signal to achieve high-speed transmission.

In general, the electronic device D1 and the electronic device D2 have similar or the same structure and operations. The following paragraphs mainly describe the electronic device D1, and the electronic device D2 is a far-end linked partner.

As illustrated in FIG. 1, the electronic device D1 includes a processor circuit 110, a frequency-domain-to-time-domain converter circuit 120, a transmitter circuit 130, a hybrid circuit 140, a receiver circuit 150, and a time-domain-to-frequency-domain converter circuit 160.

In some embodiments, the transmitter circuit 130 includes a modulator circuit 131, a digital-to-analog converter circuit 132, and a filter driver circuit 133.

In some embodiments, the receiver circuit 150 includes a filter amplifier circuit 151, an analog-to-digital converter circuit 152, and an internal circuit 153.

The processor circuit 110 is coupled to the frequency-domain-to-time-domain converter circuit 120. The frequency-domain-to-time-domain converter circuit 120 is coupled to the modulator circuit 131. The modulator circuit 131 is coupled to the digital-to-analog converter circuit 132. The digital-to-analog converter circuit 132 is coupled to the filter driver circuit 133. The filter driver circuit 133 is coupled to the hybrid circuit 140. The hybrid circuit 140 is coupled to the filter amplifier circuit 151. The filter amplifier circuit 151 is coupled to the analog-to-digital converter circuit 152. The analog-to-digital converter circuit 152 is coupled to the internal circuit 153. The internal circuit 153 is coupled to the time-domain-to-frequency-domain converter circuit 160. The time-domain-to-frequency-domain converter circuit 160 is coupled to the processor circuit 110. In addition, the hybrid circuit 140 can be coupled to the electronic device D2 such that the electronic device D1 and the electronic device D2 are coupled (connected or linked) to each other.

In some embodiments, the processor circuit 110 can be implemented by a digital signal processor (DSP). The processor circuit 110 can generate a frequency-domain transmitting signal FTS. For example, the processor circuit 110 can generate a multi-tone signal in which the multiple tones are orthogonal to each other such that there are signal components in specific frequency bands of the frequency-domain transmitting signal FTS and there is no signal component in other frequency bands of the frequency-domain transmitting signal FTS.

In some embodiments, the frequency-domain-to-time-domain converter circuit 120 can be an Application Specific Integrated Circuit (ASIC) which can implement the Inverse Fast Fourier Transform (IFFT) process. The frequency-domain-to-time-domain converter circuit 120 can convert the frequency-domain transmitting signal FTS into a time-domain transmitting signal TTS1.

In some embodiments, the modulator circuit 131 can be implemented by a Pulse-Amplitude Modulation (PAM) modulator. The modulator circuit 131 can use the pulse amplitude modulation method to modulate the time-domain transmitting signal TTS1 to multiple voltage levels so as to generate a modulation signal MS.

In some embodiments, the digital-to-analog converter circuit 132 can be implemented by a digital-to-analog converter. The digital-to-analog converter circuit 132 can convert the digital modulation signal MS into an analog signal AS.

In some embodiments, the filter driver circuit 133 can be implemented by an analog filter and a Line Driver (LD). The filter driver circuit 133 can filter and amplify the analog signal AS to generate a time-domain transmitting signal TTS2 and transmit the time-domain transmitting signal TTS2 to the hybrid circuit 140.

Figure 2:
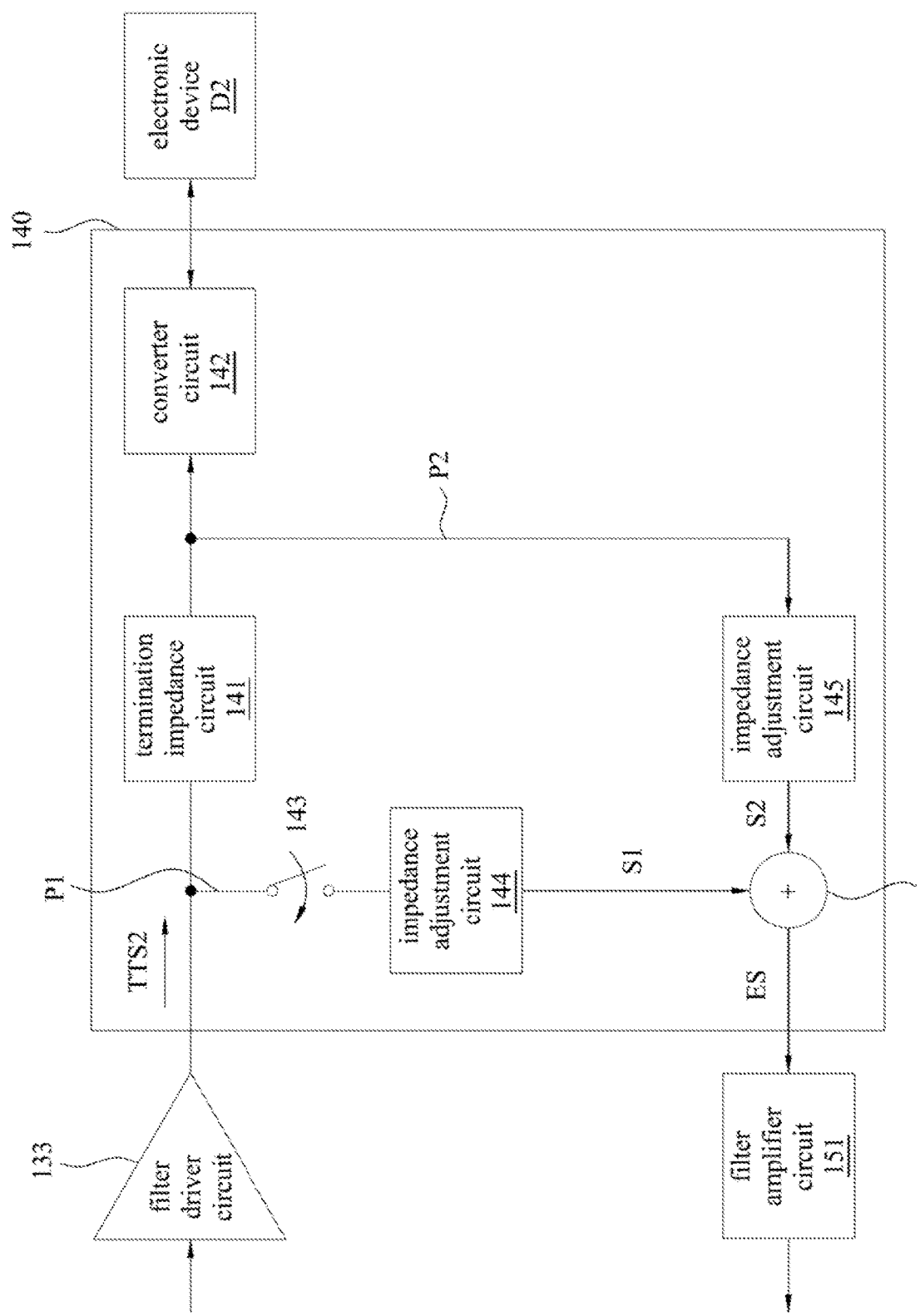
FIG. 2 is a schematic diagram of a hybrid circuit according to some embodiments of the present disclosure.

Reference is made to FIG. 2. FIG. 2 is a schematic diagram of the hybrid circuit 140 according to some embodiments of the present disclosure.

As illustrated in FIG. 2, the hybrid circuit 140 includes a termination impedance circuit 141, a converter circuit 142, a switch 143, an impedance adjustment circuit 144, an impedance adjustment circuit 145, and an adder 146.

The termination impedance circuit 141 is coupled between a first terminal of an echo noise cancelling path P1 and a first terminal of an echo noise path P2. The adder 146 is coupled between a second terminal of the echo noise cancelling path P1 and a second terminal of the echo noise path P2.

The echo noise cancelling path P1 includes the switch 143 and the impedance adjustment circuit 144. A first terminal of the switch 143 is coupled to a node between the filter driver circuit 133 and the termination impedance circuit 141. A second terminal of the switch 143 is coupled to an input terminal of the impedance adjustment circuit 144. An output terminal of the impedance adjustment circuit 144 is coupled to one input terminal of the adder 146. When the switch 143 is turned on, the echo noise cancelling path P1 is turned on. On the contrary, when the switch 143 is turned off, the echo noise cancelling path P1 is turned off. In other words, the switch 143 can be used to turn on or turn off the echo noise cancelling path P1.

The echo noise path P2 includes the impedance adjustment circuit 145. An input terminal of the impedance adjustment circuit 145 is coupled to a node between the termination impedance circuit 141 and the converter circuit 142. An output terminal of the impedance adjustment circuit 145 is coupled to the other one input terminal of the adder 146. An output terminal of the adder 146 is coupled to the filter amplifier circuit 151. The converter circuit 142 is coupled between the termination impedance circuit 141 and the electronic device D2.

In some embodiments, the impedance adjustment circuit 144 or the impedance adjustment circuit 145 can include multiple switches, multiple capacitors, and multiple resistors. In operation, a set of coefficients can be set to determine an impedance value of the impedance adjustment circuit 144 or the impedance adjustment circuit 145. For example, the capacitance values of the capacitors can be 33 nF, 66 nF, and so on. However, the present disclosure is not limited to the implementations above. Various suitable impedance adjustment circuits are within the contemplated scopes of the present disclosure.

In general, the electronic device D1 intends to transmit the time-domain transmitting signal TTS2 to the electronic device D2. However, in the full-duplex structure, the electronic device D1 can receive the signal from the electronic device D2 (through the converter circuit 142 and the impedance adjustment circuit 145 on the echo noise path P2). However, due to the echo noise path P2, a part of signal in the time-domain transmitting signal TTS2 leaks back into the filter amplifier circuit 151 through the termination impedance circuit 141 and the impedance adjustment circuit 145 on the echo noise path P2 to form the echo noise (e.g., a signal S2). The echo noise is also called near-end echo noise. The echo noise cancelling path P1 can be used to cancel the echo noise. For example, when the switch 143 is turned on, the time-domain transmitting signal TTS2 is also inputted into the impedance adjustment circuit 144 through the turned-on switch 143 to generate a signal S1 with opposite polarity to the signal S2. Then, the adder 146 adds the signal S1 and the signal S2 with opposite polarities to generate a signal ES. Since the signal S1 and the signal S2 are with opposite polarities, the signal S1 can be used to cancel the signal S2 to achieve the effect of cancelling the echo noise.

Reference is made to FIG. 1 again. In some embodiments, the filter amplifier circuit 151 can be implemented by a programmable gain amplifier and a filter. The filter amplifier circuit 151 can filter and amplify the signal ES from the hybrid circuit 140 to generate a filtered amplified signal FAS.

In some embodiments, the analog-to-digital converter circuit 152 can be implemented by an analog-to-digital converter. The analog-to-digital converter circuit 152 can convert the analog filtered amplified signal FAS into a digital signal DS.

In some embodiments, the internal circuit 153 can include equalizers or other inner receiver circuits. The internal circuit 153 can generate a time-domain receiving signal TRS according to the digital signal DS.

In some embodiments, the time-domain-to-frequency-domain converter circuit 160 can be an Application Specific Integrated Circuit which can implement the Fast Fourier Transform (FFT) process. The time-domain-to-frequency-domain converter circuit 160 can convert the time-domain receiving signal TRS into a frequency-domain receiving signal FRS, and transmit the frequency-domain receiving signal FRS to the processor circuit 110.

Figure 3:
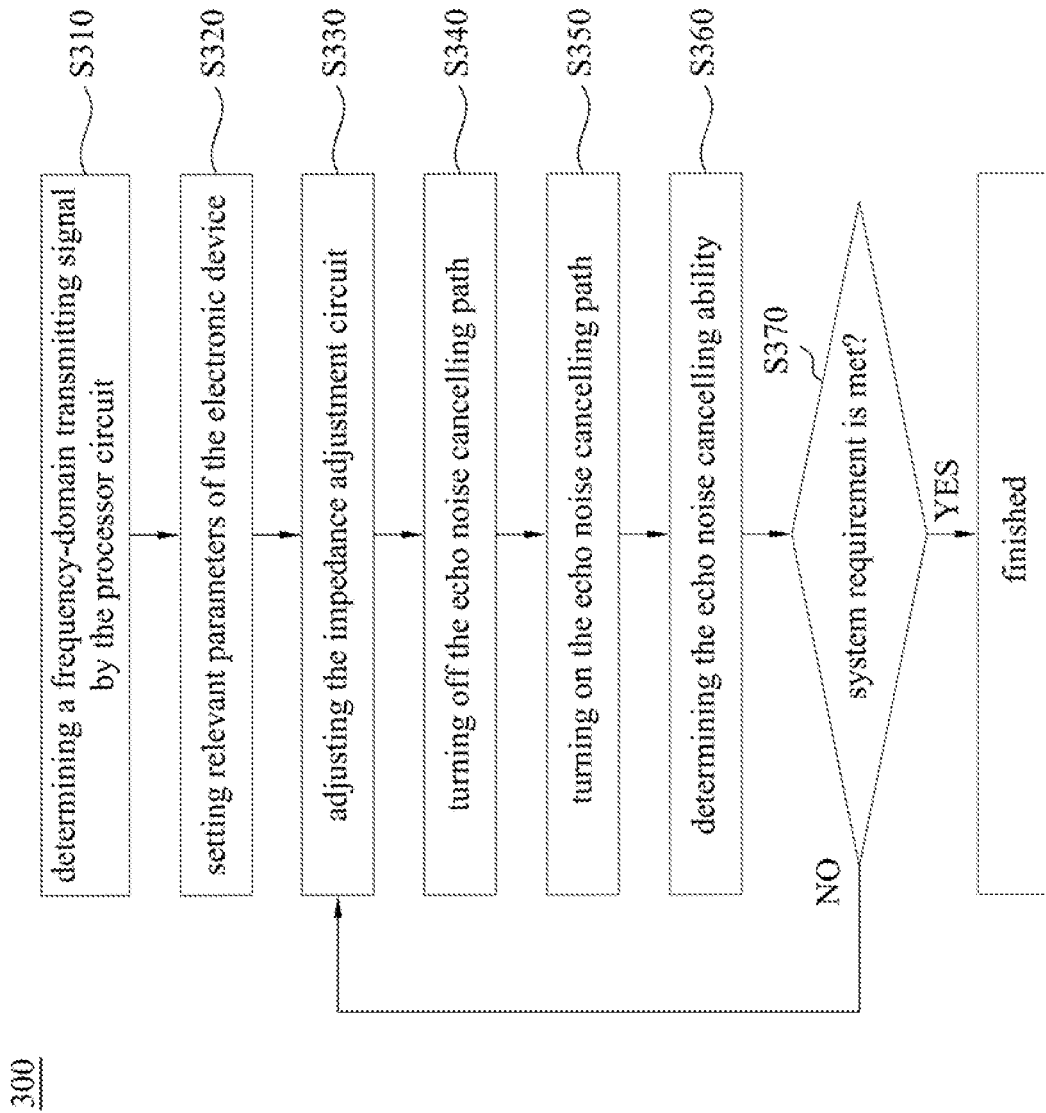
FIG. 3 is a flow diagram of a determination method for determining an echo noise cancelling ability according to some embodiments of the present disclosure.

Reference is made to FIG. 3. FIG. 3 is a flow diagram of a determination method 300 for determining an echo noise cancelling ability according to some embodiments of the present disclosure. As illustrated in FIG. 3, the determination method 300 includes operation S310, operation S320, operation S330, operation S340, operation S350, operation S360, and operation S370.

In some embodiments, the determination method 300 can be applied to the communication system SYS in FIG. 1, but the present disclosure is not limited thereto. For better understanding, the determination method 300 is described in following paragraphs with reference to FIG. 1 and FIG. 2.

In operation S310, the processor circuit 110 determines the frequency-domain transmitting signal FTS. As described above, the processor circuit 110 can determine that the frequency-domain transmitting signal FTS with signal components in specific frequency bands (there is no signal component in other frequency bands).

Operation S320 is for setting relevant parameters of the electronic device D1. For example, the processor circuit 110 or a control circuit (not shown) can control amplifying levels of the filter amplifier circuit 151, filtering frequency bands of the filter amplifier circuit 151, filtering frequency bands of the filter driver circuit 133, or parameters of other circuits in the electronic device D1. In addition, the electronic device D1 can be coupled (connected or linked) to the electronic device D2, and the electronic device D2 is set to not transmit signals.

Operation S330 is for adjusting the impedance adjustment circuit 144 and the impedance adjustment circuit 145. For example, the processor circuit 110 or a control circuit (not shown) can adjust the impedance values of the impedance adjustment circuit 144 and the impedance adjustment circuit 145 to be initial impedance values.

Operation S340 is for turning off the echo noise cancelling path P1. For example, the processor circuit 110 or a control circuit (not shown) can turn off the switch 143. When the switch 143 is turned off, the echo noise cancelling path P1 is turned off. Under this condition, the processor circuit 110 generates the frequency-domain transmitting signal FTS which is determined in operation S310. Then, the frequency-domain-to-time-domain converter circuit 120 converts the frequency-domain transmitting signal FTS into the time-domain transmitting signal TTS1. Then, the transmitter circuit 130 generates the time-domain transmitting signal TTS2 according to the time-domain transmitting signal TTS1. Then, as illustrated in FIG. 2, as described above, a part of signal in the time-domain transmitting signal TTS2 leaks back into the receiver circuit 150 through the termination impedance circuit 141, the impedance adjustment circuit 145 on the echo noise path P2, and the adder 146 to form the echo noise (e.g., the signal S2). Then, with the operations of the receiver circuit 150 and the time-domain-to-frequency-domain converter circuit 160, the processor circuit 110 can receive a frequency-domain receiving signal FRS1 from the time-domain-to-frequency-domain converter circuit 160.

Figure 4:
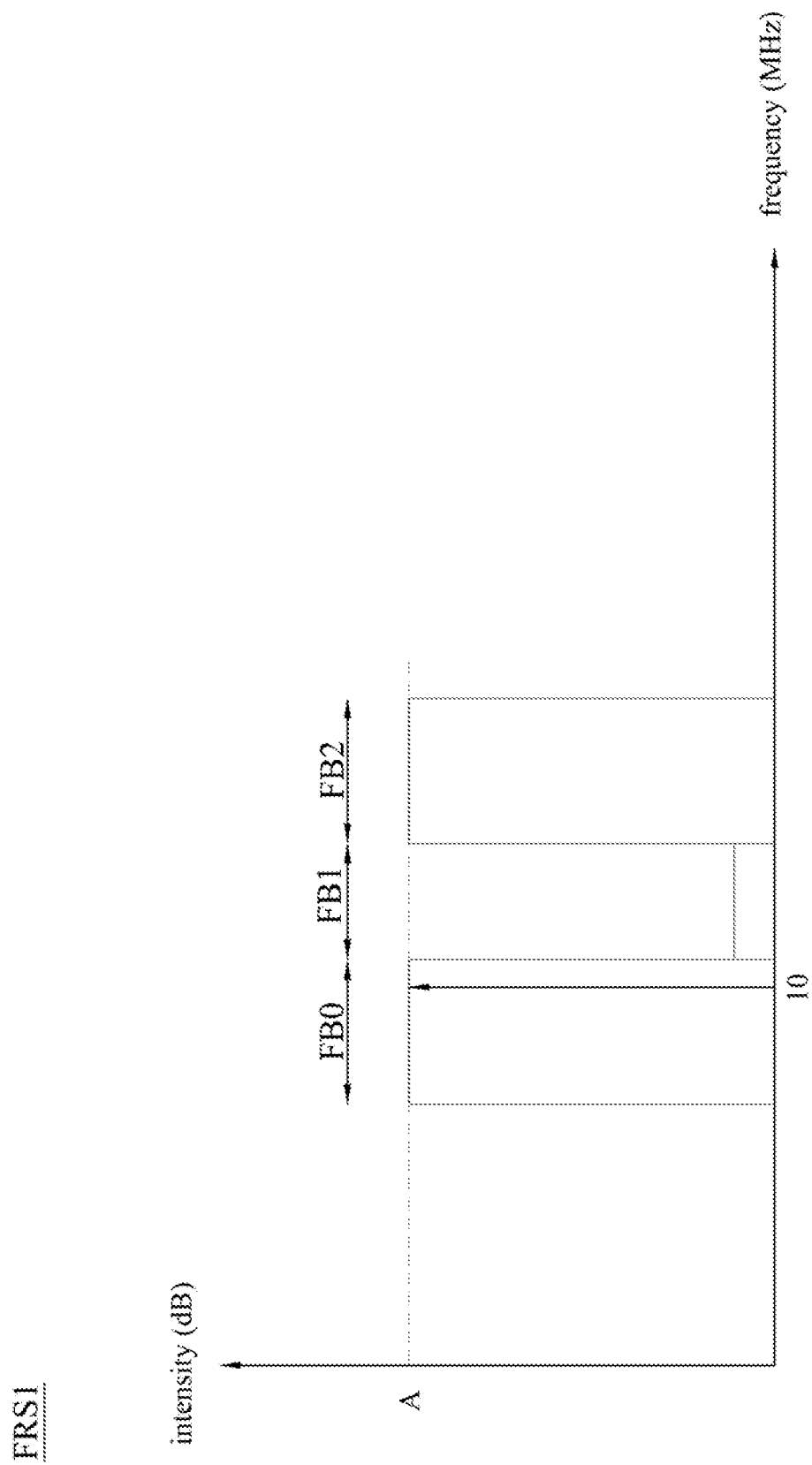
FIG. 4 is a schematic diagram of a frequency-domain receiving signal under a condition that an echo noise cancelling path in FIG. 2 is turned off according to some embodiments of the present disclosure.

Reference is made to FIG. 4. FIG. 4 is a schematic diagram of the frequency-domain receiving signal FRS1 under a condition that an echo noise cancelling path P1 in FIG. 2 is turned off according to some embodiments of the present disclosure. Frequency bands FB0 and FB2 are frequency bands with signal components in the original frequency-domain transmitting signal FTS, and a frequency band FB1 is a frequency band without any signal component in the original frequency-domain transmitting signal FTS. The components in the frequency band FB1 in FIG. 4 are noise.

Operation S350 is for turning on the echo noise cancelling path P1. For example, the processor circuit 110 or a control circuit (not shown) can turn on the switch 143. When the switch 143 is turned on, the echo noise cancelling path P1 is turned on. Under this condition, the processor circuit 110 generates the frequency-domain transmitting signal FTS which is determined in operation S310. Then, the frequency-domain-to-time-domain converter circuit 120 converts the frequency-domain transmitting signal FTS into the time-domain transmitting signal TTS1. Then, the transmitter circuit 130 generates the time-domain transmitting signal TTS2 according to the time-domain transmitting signal TTS1. Then, as shown in FIG. 2, a part of signal in the time-domain transmitting signal TTS2 is transmitted through the turned-on switch 143 and the impedance adjustment circuit 144 to generate the signal S1. Then, the adder 146 adds the signal S1 and the signal S2 with opposite polarities to utilize the signal S1 to cancel the echo noise the signal S2. Then, by the operations of the receiver circuit 150 and the time-domain-to-frequency-domain converter circuit 160, the processor circuit 110 can receive a frequency-domain receiving signal FRS2 from the time-domain-to-frequency-domain converter circuit 160.

Figure 5:
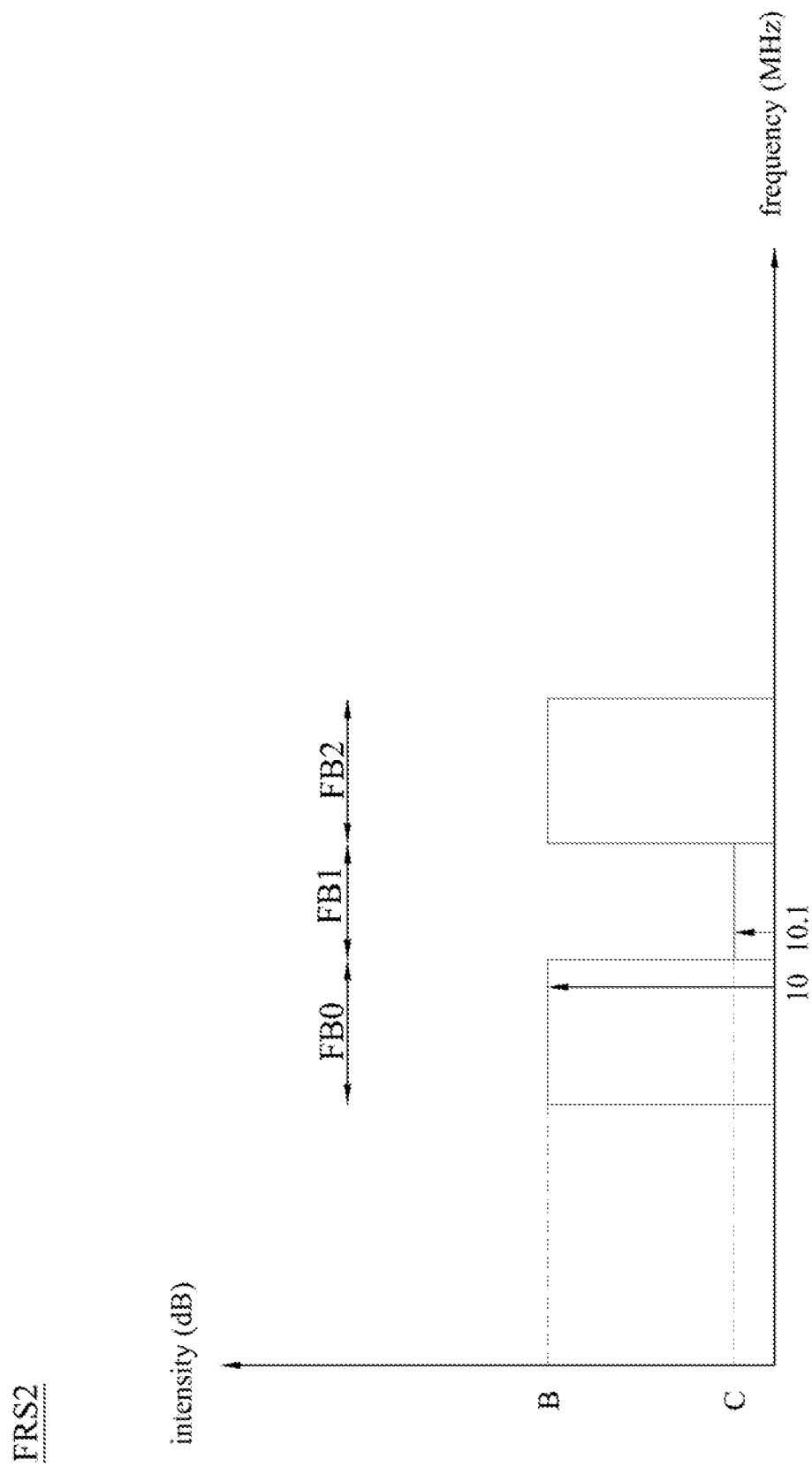
FIG. 5 is a schematic diagram of a frequency-domain receiving signal under a condition that the echo noise cancelling path in FIG. 2 is turned on according to some embodiments of the present disclosure.

Reference is made to FIG. 5. FIG. 5 is a schematic diagram of the frequency-domain receiving signal FRS2 under a condition that the echo noise cancelling path P1 in FIG. 2 is turned on according to some embodiments of the present disclosure.

In operation S360, the processor circuit 110 determines an echo noise cancelling ability of the hybrid circuit 140 according to the frequency-domain receiving signal FRS1 and the frequency-domain receiving signal FRS2. For example, the echo noise cancelling ability of the hybrid circuit 140 includes a linear echo noise cancelling ability and a non-linear echo noise cancelling ability. The processor circuit 110 can calculate the linear echo noise cancelling ability and the non-linear echo noise cancelling ability of the hybrid circuit 140 according to the frequency-domain receiving signal FRS1 and the frequency-domain receiving signal FRS2. As illustrated in FIG. 4 and FIG. 5, the processor circuit 110 can make the intensity B corresponding to 10 megahertz in FIG. 5 be subtracted from the intensity A corresponding to 10 megahertz in FIG. 4 to acquire the linear echo noise cancelling ability corresponding to 10 megahertz of the hybrid circuit 140. In addition, the processor circuit 110 can make the intensity C corresponding to 10.1 megahertz in FIG. 5 be subtracted from the intensity A corresponding to 10 megahertz in FIG. 4 to acquire the non-linear echo noise cancelling ability corresponding to 10 megahertz of the hybrid circuit 140. In one embodiment, the processor circuit 110 adjusts the signal components of the frequency-domain transmitting signal FTS to another specific frequency band (there is no signal component in other frequency bands of the frequency-domain transmitting signal FTS) to test the echo noise cancelling ability of this another specific frequency band. The linear echo noise cancelling ability and the non-linear echo noise cancelling ability of other specific frequency bands can be calculated by using similar principles.

In operation S370, the processor circuit 110 determines whether the hybrid circuit 140 meets a system requirement. For example, the processor circuit 110 can determine whether the hybrid circuit 140 meets the system requirement according to the linear echo noise cancelling ability or the non-linear echo noise cancelling ability calculated in operation S360.

When it is determined that the parameters of the hybrid circuit 140 do not meet the system requirement, operation S330 is entered again and the impedance value of the impedance adjustment circuit 144 or the impedance adjustment circuit 145 is adjusted again. In some embodiments, only the impedance value of the impedance adjustment circuit 144 is adjusted. In some embodiments, only the impedance value of the impedance adjustment circuit 145 is adjusted. In some embodiments, both of the impedance values of the impedance adjustment circuit 144 and the impedance adjustment circuit 145 are adjusted. Then, operation S340, operation S350, operation S360, and operation S370 are performed again.

When it is determined that the parameters of the hybrid circuit 140 meet the system requirement, the determination method 300 is finished. In general, when the design of the hybrid circuit 140 is better, the signal-to-noise ratio (SNR) of the system is better. Accordingly, the subsequent link is established according to the aforementioned setting of the hybrid circuit 140.

As described above, compared to some related approaches, in the present disclosure, by the cooperative operations of the frequency-domain-to-time-domain converter circuit and the time-domain-to-frequency-domain converter circuit, the processor circuit can determine the echo noise cancelling ability of the hybrid circuit according to two frequency-domain receiving signals (one corresponding to the condition that the echo noise cancelling path is turned off, the other corresponding to the condition that the echo noise cancelling path is turned on). Since the echo noise cancelling ability of a specific frequency band can be estimated in the frequency domain, it can evaluate whether the hybrid circuit meets the system requirement in each frequency band in detail and can adjust the relevant parameters more accurately.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A communication system, comprising:
a first electronic device; and
a second electronic device coupled to the first electronic device,
wherein the first electronic device comprises:
a processor circuit configured to generate a frequency-domain transmitting signal;
a frequency-domain-to-time-domain converter circuit configured to convert the frequency-domain transmitting signal into a first time-domain transmitting signal;
a transmitter circuit configured to generate a second time-domain transmitting signal according to the first time-domain transmitting signal;
a hybrid circuit comprising an echo noise cancelling path and an echo noise path;
a receiver circuit coupled to the hybrid circuit; and
a time-domain-to-frequency-domain converter circuit coupled between the receiver circuit and the processor circuit,
wherein when the echo noise cancelling path is turned off, the processor circuit receives a first frequency- domain receiving signal from the time-domain-to-frequency-domain converter circuit, wherein when the echo noise cancelling path is turned on, the processor circuit receives a second frequency-domain receiving signal from the time-domain-to-frequency-domain converter circuit, wherein the processor circuit determines an echo noise cancelling ability of the hybrid circuit according to the first frequency-domain receiving signal and the second frequency-domain receiving signal.

2. The communication system of claim 1, wherein the hybrid circuit comprises:

a termination impedance circuit coupled between a first terminal of the echo noise cancelling path and a first terminal of the echo noise path; and an adder coupled between a second terminal of the echo noise cancelling path and a second terminal of the echo noise path.

3. The communication system of claim 2, wherein the echo noise cancelling path comprises:

a switch coupled to the termination impedance circuit; and a first impedance adjustment circuit coupled between the switch and the adder, wherein when the switch is turned off, the echo noise cancelling path is turned off, wherein when the switch is turned on, the echo noise cancelling path is turned on.

4. The communication system of claim 3, wherein the echo noise path comprises:

a second impedance adjustment circuit coupled between the termination impedance circuit and the adder.

5. The communication system of claim 4, wherein the echo noise cancelling ability comprises a linear echo noise cancelling ability and a non-linear echo noise cancelling ability, wherein the processor circuit calculates the linear echo noise cancelling ability and the non-linear echo noise cancelling ability of the hybrid circuit according to the first frequency-domain receiving signal and the second frequency-domain receiving signal.

6. The communication system of claim 5, wherein the processor circuit determines whether the hybrid circuit meets a system requirement according to the linear echo noise cancelling ability or the non-linear echo noise cancelling ability, wherein when the hybrid circuit does not meet the system requirement, the processor circuit adjusts the first impedance adjustment circuit or the second impedance adjustment circuit.

7. The communication system of claim 3, wherein the transmitter circuit comprises:

a modulator circuit coupled to the frequency-domain-to-time-domain converter circuit;

a digital-to-analog converter circuit coupled to the modulator circuit; and a filter driver circuit coupled between the digital-to-analog converter circuit and the switch.

8. The communication system of claim 7, wherein the receiver circuit comprises:

a filter amplifier circuit coupled to the adder;

an analog-to-digital converter circuit coupled to the filter amplifier circuit; and an internal circuit coupled between the analog-to-digital converter circuit and the time-domain-to-frequency-domain converter circuit.

9. An electronic device applied to a communication system, wherein the electronic device comprises:

a processor circuit configured to generate a frequency-domain transmitting signal;

a frequency-domain-to-time-domain converter circuit configured to convert the frequency-domain transmitting signal into a first time-domain transmitting signal;

a transmitter circuit configured to generate a second time-domain transmitting signal according to the first time-domain transmitting signal;

a hybrid circuit comprising an echo noise cancelling path and an echo noise path;

a receiver circuit coupled to the hybrid circuit; and a time-domain-to-frequency-domain converter circuit coupled between the receiver circuit and the processor circuit, wherein when the echo noise cancelling path is turned off, the processor circuit receives a first frequency-domain receiving signal from the time-domain-to-frequency-domain converter circuit, wherein when the echo noise cancelling path is turned on, the processor circuit receives a second frequency-domain receiving signal from the time-domain-to-frequency-domain converter circuit, wherein the processor circuit determines an echo noise cancelling ability of the hybrid circuit according to the first frequency-domain receiving signal and the second frequency-domain receiving signal.

10. The electronic device of claim 9, wherein the hybrid circuit comprises:

a termination impedance circuit coupled between a first terminal of the echo noise cancelling path and a first terminal of the echo noise path; and an adder coupled between a second terminal of the echo noise cancelling path and a second terminal of the echo noise path.

11. The electronic device of claim 10, wherein the echo noise cancelling path comprises:

a switch coupled to the termination impedance circuit; and a first impedance adjustment circuit coupled between the switch and the adder, wherein when the switch is turned off, the echo noise cancelling path is turned off, wherein when the switch is turned on, the echo noise cancelling path is turned on.

12. The electronic device of claim 11, wherein the echo noise path comprises:

a second impedance adjustment circuit coupled between the termination impedance circuit and the adder.

13. The electronic device of claim 12, wherein the echo noise cancelling ability comprises a linear echo noise cancelling ability and a non-linear echo noise cancelling ability, wherein the processor circuit calculates the linear echo noise cancelling ability and the non-linear echo noise cancelling ability of the hybrid circuit according to the first frequency-domain receiving signal and the second frequency-domain receiving signal.

14. The electronic device of claim 13, wherein the processor circuit determines whether the hybrid circuit meets a system requirement according to the linear echo noise cancelling ability or the non-linear echo noise cancelling ability, wherein when the hybrid circuit does not meet the system requirement, the processor circuit adjusts the first impedance adjustment circuit or the second impedance adjustment circuit.

15. The electronic device of claim 11, wherein the transmitter circuit comprises:

a modulator circuit coupled to the frequency-domain-to-time-domain converter circuit;

a digital-to-analog converter circuit coupled to the modulator circuit; and a filter driver circuit coupled between the digital-to-analog converter circuit and the switch.

16. The electronic device of claim 15, wherein the receiver circuit comprises:

a filter amplifier circuit coupled to the adder;

an analog-to-digital converter circuit coupled to the filter amplifier circuit; and an internal circuit coupled between the analog-to-digital converter circuit and the time-domain-to-frequency-domain converter circuit.

17. A determination method for determining an echo noise cancelling ability, wherein the determination method is applied to an electronic device in a communication system, wherein the determination method comprises:

when an echo noise cancelling circuit in a hybrid circuit in the electronic device is turned off, generating, by a processor circuit in the electronic device, a frequency-domain transmitting signal, and converting, by a frequency-domain-to-time-domain converter circuit in the electronic device, the frequency-domain transmitting signal into a time-domain transmitting signal such that the processor circuit receives a first frequency-domain receiving signal from a time-domain-to-frequency-domain converter circuit;

when the echo noise cancelling circuit is turned on, generating, by the processor circuit, the frequency-domain transmitting signal, and converting, by the frequency-domain-to-time-domain converter circuit, the frequency-domain transmitting signal into the time-domain transmitting signal such that the processor circuit receives a second frequency-domain receiving signal from the time-domain-to-frequency-domain converter circuit; and determining, by the processor circuit, an echo noise cancelling ability of the hybrid circuit according to the first frequency-domain receiving signal and the second frequency-domain receiving signal.

18. The determination method of claim 17, wherein the echo noise cancelling path comprises a switch and a first impedance adjustment circuit, wherein when the switch is turned off, the echo noise cancelling path is turned off, wherein when the switch is turned on, the echo noise cancelling path is turned on, wherein the hybrid circuit further comprises an echo noise path, and the echo noise path comprises a second impedance adjustment circuit.

19. The determination method of claim 18, wherein the echo noise cancelling ability comprises a linear echo noise cancelling ability and a non-linear echo noise cancelling ability, wherein the processor circuit calculates the linear echo noise cancelling ability and the non-linear echo noise cancelling ability of the hybrid circuit according to the first frequency-domain receiving signal and the second frequency-domain receiving signal.

20. The determination method of claim 19, further comprising:

determining, by the processor circuit, whether the hybrid circuit meets a system requirement according to the linear echo noise cancelling ability or the non-linear echo noise cancelling ability; and when the hybrid circuit does not meet the system requirement, adjusting, by the processor circuit, the first impedance adjustment circuit or the second impedance adjustment circuit.

* * * * *